Sept. 9, 1941.    H. W. BOUSMAN    2,255,502
CREST VOLTMETER
Filed Dec. 23, 1940

Inventor:
Henry W. Bousman,
by Harry E. Dunham
His Attorney.

UNITED STATES PATENT OFFICE 2,255,502

CREST VOLTMETER

Henry W. Bousman, Scotia, N. Y., assignor to General Electric Company, a corporation of New York Application December 23, 1940, Serial No. 371,305

4 Claims. (Cl. 171—95)

My invention relates to apparatus for measuring the crest voltage on high or medium voltage alternating current lines or apparatus. The invention is particularly useful for measuring crest voltages used in the high voltage testing of insulation because the stresses involved are proportional to the maximum rather than the root mean square value of the test voltage. An important object of my invention is to provide relatively simple crest voltmeter equipment of high accuracy, and a second object of my invention is to provide a double range crest voltmeter of improved design.

Figure 1:
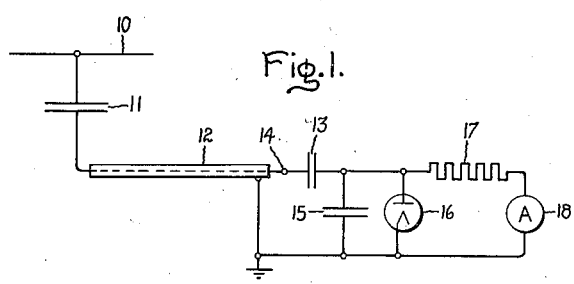
Figure 2:
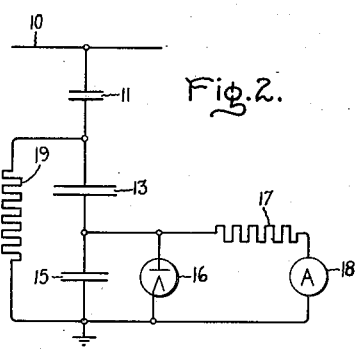
Figure 3:
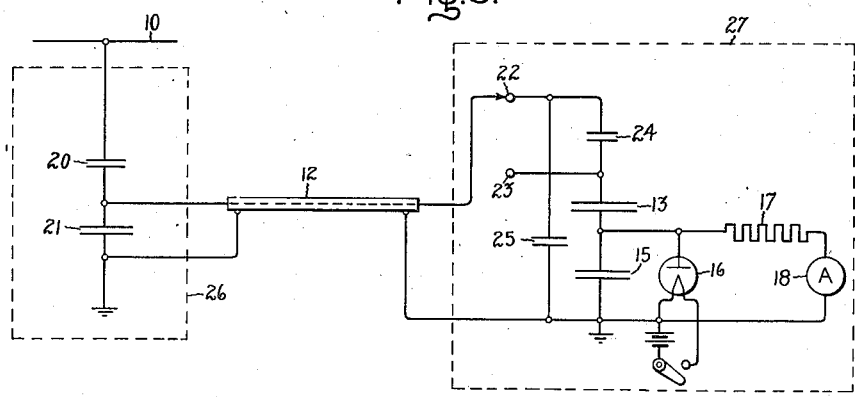
Figure 4:
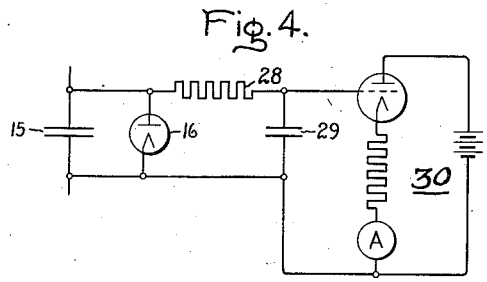

The features of my invention which are believed to be novel and patentable will be pointed out in the claims appended hereto. For a better understanding of my invention reference is made in the following description to the accompanying drawing in which Fig. 1 represents a single range crest voltmeter embodying my invention; Fig. 2 is an equivalent circuit representation of the apparatus of Fig. 1; Fig. 3 represents a double range crest voltmeter embodying my invention; and Fig. 4 represents a vacuum tube voltmeter that may be used with my invention.

In Fig. 1, 10 represents a conductor between which and ground a high alternating voltage exists. My crest voltmeter is shown connected to line 10 through the voltage reducing condenser connection 11 and the insulation of a high voltage cable 12.

Included as a part of my crest voltmeter at the point of measurement is a condenser 13 connected between the crest voltmeter proper and the high voltage input terminal 14. The condenser 13 is an important part of my invention and its purpose is to materially reduce errors in measurement caused by any leakage resistance that may exist between the high voltage system and the low voltage terminal which is generally grounded as shown. The crest voltmeter proper comprises a condenser 15 which serves both as a storage condenser and as a part of a voltage divider, a one-way rectifier 16 for charging condenser 15 and a circuit containing resistance 17 and micro-ammeter 18 for measuring the condenser voltage. The leakage resistance referred to is that which is ordinarily due to leakage through the insulation from the high voltage condenser 11, if used, to ground and through the insulation on the lead or cable 12 from condenser 11 to the place where the crest voltmeter is located. In Fig. 2 this leakage resistance is represented by 19. It is evident that if condenser 13 were omitted, the leakage resistance 19 would be connected directly in shunt to the condenser 15, thereby materially increasing the error which is due to the generally unavoidable presence of such leakage resistance.

The rectifier 16 is a half-wave rectifier of the vacuum tube heated cathode type. It by-passes the A. C. voltage wave of one polarity and the voltage wave of the opposite polarity flows into and charges the storage condenser 15 which thus tends to charge to a voltage proportional to the crest voltage to be measured. This voltage is indicated by the instrument 18 connected across the condenser 15 through a high resistance 17. It will be noted that condenser 15 is here used both as the storage condenser of the meter and as a part of the potential divider.

There are two sources of error in the circuit shown and the voltage developed across condenser 15 will be less than the crest voltage to be measured by the sum of such errors. One of these errors is caused by the discharge of condenser 15 through the instrument circuit which necessarily reduces the condenser voltage from the crest value which it would reach without such discharge and is equal to $$\frac{1}{2fR_{17}C_{15}}$$

where $f$ is the frequency, $R_{17}$ the resistance of the instrument circuit represented by 17 in the drawing and $C_{15}$ is the capacitance of the storage condenser 15. Commercially available current measuring instruments of high sensitivity may be used with commercially suitable capacitance divider capacitors without excessive error from this cause. The other source of error is that which is due to the presence of the leakage resistance 19 in shunt to a portion of the capacitance divider and is equal to $$\frac{X^2}{2R^2_{19}}$$

$R_{19}$ is the leakage resistance and $$X = \frac{1}{2\pi f\left(C_{11} + \frac{C_{13}C_{15}}{C_{13}+C_{15}}\right)}$$

where $C_{11}$, $C_{13}$ and $C_{15}$ are the capacitances of the condensers of corresponding numbers in Fig. 2.

If in Fig. 2 the condenser 13 were omitted so that the leakage resistance 19 was directly in shunt to the storage condenser 15, which has a direct current voltage across it, the error due to its presence would be $$\frac{1}{2fR_{19}C_{15}}$$

Ordinarily this would increase the probable error materially and hence the presence of condenser 13 to segregate the storage condenser 15 from any leakage resistance that may exist across the terminals of the crest voltmeter circuit is desirable and it should be built in as a part of the crest voltmeter and be well insulated to prevent leakage directly across condenser 15.

It is seen that I have provided a crest voltmeter with inherent good accuracy and which uses a relatively few standard elements, the condenser 15 being used for the double purpose of a storage condenser across which the crest voltage is measured and as a part of the potential divider employed.

Without confining my invention, as shown in Fig. 2 to any particular set of circuit constants, it may be helpful to set forth one set of values for the different circuit elements, desirable when measuring peak voltages on line 10 up to 100,000 volts at or above 60 cycles as follows: condenser 11, .00025 microfarad; condenser 13, 1.0 microfarad; condenser 15, 0.5 microfarad; resistance 17, 1 megohm with a micro-ammeter instrument at 18 requiring 50 micro-amperes for full scale deflection. The leakage resistance represented at 19 is likely to have most any value greater than $\frac{1}{10}$ megohm. The error due to a $\frac{1}{10}$ megohm leakage resistance will be approximately .3%. If the same leakage resistance had been connected directly across condenser 15, the error would be about 15%. For measuring low voltages, say below 200 volts, the condenser 11 will be omitted.

In Fig. 3 I have represented a double range crest voltmeter embodying my invention with a built-in potential divider. In Fig. 3 condensers 20 and 21 represent elements of an external potential divider designated 26 with my crest voltmeter connected across the condenser 21 thereof through the insulated line 12. My double range crest voltmeter comprises the parts enclosed in the dotted line rectangle 27. Parts 13, 15, 16, 17 and 18 correspond to the parts of like number in Fig. 2 although the circuit constant values do not necessarily correspond. In Fig. 3 the incoming line may be connected to either terminal 22 or 23 to obtain two different measurement ratios. For example, using the low-high voltage terminal 23 the instrument 18 may be calibrated directly in the peak voltage applied at 23. Then using the high-high voltage terminal 22, we would multiply the instrument reading by the ratio factor which we will designate K to obtain the peak voltage applied at 22. Where the external potential divider is also used as represented in the drawing, the instrument reading will also be multiplied by the ratio of the external potential divider which I will designate N. Thus if the crest voltage to be measured is, say 30 volts, it may be applied directly to terminal 23 and the instrument 18 will be calibrated to read, say 30. If the voltage to be measured is 160 volts and the ratio K is 4 the voltage will be applied to terminal 22, the instrument 18 will read 40 and is to be multiplied by 4. If the voltage to be measured is 50,000 volts, for example, an external potential divided such as illustrated will be used. It may have a ratio N of 500. In such a case the connections would be as shown, using connection 22. The instrument 18 would read 25 and the reading multiplied by the factors 4 and 500, thus, 25×4×500=50,000. For a 40,000 volt measurement we would use the external voltage divider but we would preferably use the terminal 23 of the crest voltmeter. In which case the reading of meter 18 would be 8 to be multiplied by N=500.

Now, in order to be able to use the double range crest voltmeter both with and without the external voltage divider and retain the same ratio K for either the high voltage and low voltage measurements such as has been given by way of example, it is necessary to provide a certain relation between the various condensers included in the double ratio crest voltmeter arrangement, which includes the condensers 24 and 25, not heretofore mentioned. It may be stated, however, that if the external potential divider is never used, I could eliminate condenser 25 and still have a double ratio crest voltmeter with the same ratio K. Condenser 25 is necessary only when used with an external potential divider and it is desired to retain the same ratio K both with and without the use of the external potential divider 26.

Condenser 24 is chosen so that its capacitance bears such a relation to the capacitance of condensers 13 and 15 in series that the desired ratio K is obtained for the two connections 22 and 23.

Condenser 25 is of such value that the capacitance of the crest voltmeter 27 from either terminals 22 or 23 to ground is the same, hence when using the potential divider 26, shifting the connection between 22 and 23 does not change the ratio with which the total voltage divides across the external potential divider and the crest voltmeter and hence neither K nor N changes.

The relation necessary for this result is obtained when $$C_{25}=C_{24}(K-1)=\frac{C_{13}C_{15}}{C_{13}+C_{15}}$$

where $C_{13}$, $C_{24}$ and $C_{25}$ are the values of the corresponding numbered condensers and K is the ratio previously mentioned. An example of practicable values where $K=4$ is as follows:

Condenser 25 = ⅓ microfarad
Condenser 24 = ⅙ microfarad
Condenser 13 = 1 microfarad
Condenser 15 = ½ microfarad Resistance of the instrument circuit including that of instruments 18⅔ megohm. The instrument at 18 may be a d'Arsonnal micro-ammeter requiring 50 micro-amperes for full scale deflection, which is obtained with 50 volts on terminal 23 and 200 volts on terminal 22.

A satisfactory external voltage divider for use with such a crest voltmeter having a ratio N of 500 and suitable for voltages up to 100,000 volts may comprise a condenser 20 of .001 microfarad and a condenser 21 of .082 microfarad.

In some cases where the amount of energy that is available for measurement purposes is extremely small, connecting the crest voltmeter to the voltage source may result in lowering the voltage which it is desired to measure. This difficulty may be avoided if a voltmeter of very high resistance such as a voltmeter of the vacuum tube type is used to measure the voltage across condenser 15 as represented at 30 in Fig.

4. Here the vacuum tube voltmeter is connected across condenser 15 through a filter 28—29.

What I claim as new and desire to secure by Letters Patent of the United States is:

1. A crest voltmeter circuit comprising high voltage and ground connecting terminals, a pair of condensers connected in series between said terminals, a rectifier valve and a high resistance measuring instrument circuit connected in parallel across the condenser which is connected to the ground terminal, said condenser serving as a storage condenser to supply the instrument circuit and as a part of a potential divided, the condenser which is connected to the high voltage terminal serving as a part of the same potential divider and for segregating the storage condenser from any leakage resistance that may exist between the high voltage and ground terminals.

2. A crest voltmeter circuit comprising high and low voltage terminals, a pair of condensers connected in series between said terminals, a rectifier and a high resistance instrument connected in parallel to the condenser which is connected to the low voltage terminal, said condenser serving as a storage condenser to supply a direct current voltage to the instrument circuit and as a part of a potential divider and having a capacity of about half of that of the condenser connected to the high voltage terminal, the last-mentioned condenser serving as a part of the same potential divider and for segregating the storage condenser from any leakage resistance that may exist across the terminals.

3. A double range crest voltmeter comprising high-high and low-high voltage terminals and a low voltage terminal, the high voltage terminals being separated by a condenser, a pair of condensers connected in series between the low high voltage terminal and the low voltage terminal, a rectifier and a high resistance measuring instrument circuit connected across the condenser connected to the low voltage terminal, said last mentioned condenser serving as a storage condenser to supply a direct current voltage to the measuring instrument circuit and as a part of a potential divider and having a capacity greater than the first mentioned condenser but less than the other condenser of said pair, and means for connecting a measurement voltage between either of said high voltage terminals and said low voltage terminal.

4. A double range crest voltmeter comprising high-high and low-high voltage terminals and a low voltage terminal, a condenser connected between said high voltage terminals, a pair of condensers connected in series between the low-high voltage terminal and the low voltage terminal, a rectifier and a high resistance measuring circuit connected in parallel across the condenser which is connected to the low voltage terminal, said last mentioned condenser serving as a storage condenser to supply a direct current voltage to the instrument circuit and as a part of a potential divider and having a capacity greater than the first mentioned condenser but less than the other condenser of said pair; means for connecting measurement voltages between either of said high voltage terminals and said low voltage terminal and a condenser connected between the high-high voltage terminal and the low voltage terminal of such value that the capacitance of said double range crest voltmeter between the voltage measurement connections is the same for either of such connections.

HENRY W. BOUSMAN.